United States Patent [19]

Moran

[11] 4,174,524

[45] Nov. 13, 1979

[54] ULTRA HIGH SPEED GATED PULSE OPTICAL IMAGING SYSTEM

[75] Inventor: Steven E. Moran, Lakeside, Calif.

[73] Assignee: The United States of America as represented by the Secretary of the Navy, Washington, D.C.

[21] Appl. No.: 945,721

[22] Filed: Sep. 25, 1978

[51] Int. Cl.$^2$ .............................................. H04N 7/18
[52] U.S. Cl. ....................................... 358/95; 250/199; 358/99
[58] Field of Search ..................... 250/199; 358/90, 95, 358/99; 356/5, 349, 360; 313/381

[56] References Cited

U.S. PATENT DOCUMENTS

| | | | |
|---|---|---|---|
| 2,541,374 | 2/1951 | Morton | 313/381 |
| 3,426,207 | 2/1969 | Fried | 250/199 |
| 3,467,773 | 9/1969 | Heckman | 358/95 |
| 3,566,021 | 2/1971 | Jakes | 250/199 |
| 3,670,098 | 6/1972 | Korpel | 356/349 |
| 4,030,831 | 6/1977 | Gowrinathan | 356/349 |

Primary Examiner—Howard W. Britton
Attorney, Agent, or Firm—Richard S. Sciascia; Ervin F. Johnston; James O. Skarsten

[57] ABSTRACT

Apparatus for overcoming the effects of back scatter and forward scatter in viewing an object through a diffusive medium includes a projector for projecting successive picosecond coherent light pulses through the medium to the object, and also includes a light receiving element for receiving light transmitted through the medium. An optical shutter is positioned in relation to the receiving element for selectively admitting light thereto. An optical path between the source and the shutter couples light of a projected pulse to open the shutter for a picosecond at a selected interval after the pulse has been projected, in order to admit light of the pulse reflected from the object to the receiving means. Structure cooperates with the receiving element to provide sets of light responsive signals, each set representing an image of light reflective surfaces of the object which are included in one of one or more discrete viewing spaces, a display being provided for combining all of the represented images to provide an image of the object.

14 Claims, 2 Drawing Figures

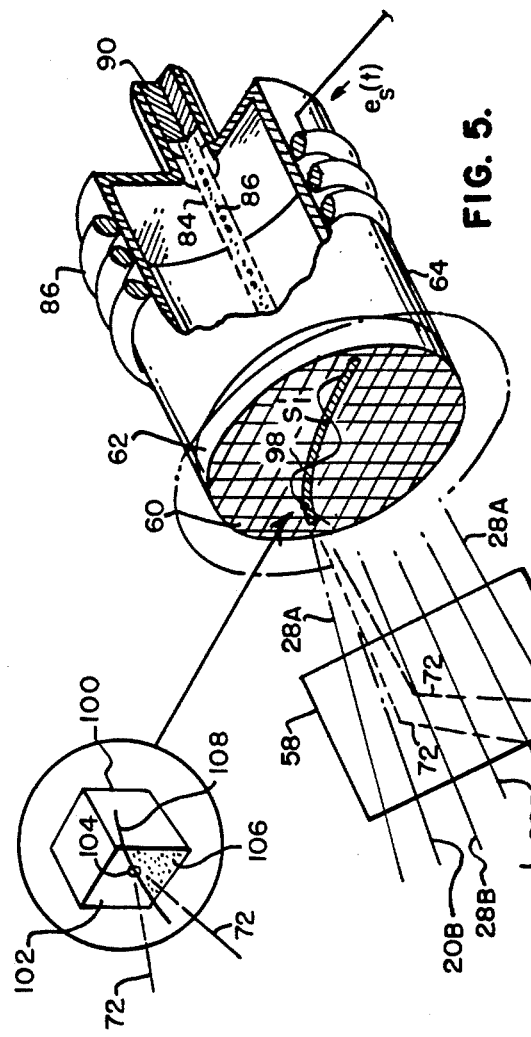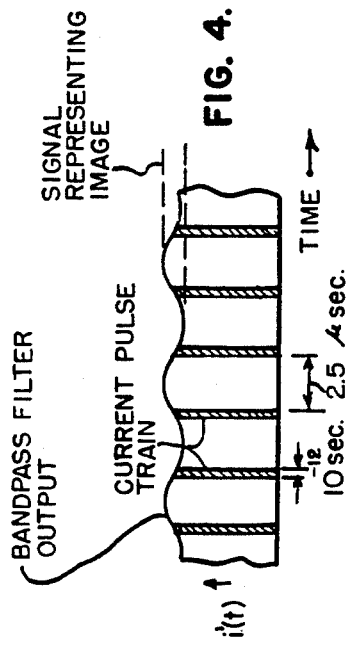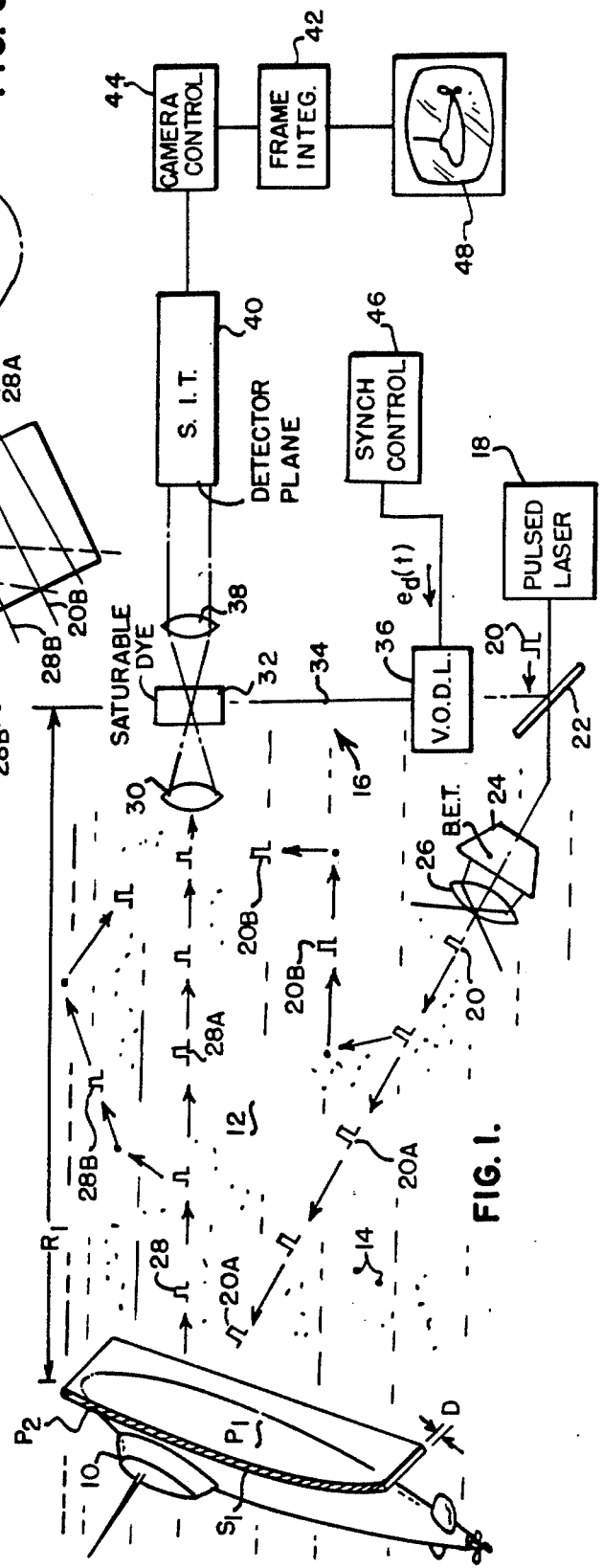

ULTRA HIGH SPEED GATED PULSE OPTICAL IMAGING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention disclosed and claimed herein pertains to the field of viewing or imaging an object through a diffusive medium by providing a system which illuminates the object with projected picosecond coherent light pulses, and then receives light reflected from the object through an optical shutter which is opened for picosecond periods in synchronization with pulse projection. More particularly, the invention pertains to such systems which successively view or image light reflective surfaces included in different discrete viewing spaces, and then combine the images to provide a complete image of the object. The field of the invention includes the field of combining a gated pulse imaging system of the above type with an optical heterodyne imaging system to overcome the degrading effects of forward scatter and back scatter in viewing an object through a dynamic diffusive medium.

The range at which an optical system viewing through a diffusive medium may form an image of an object is substantially limited by the phenomenon of forward scatter, and if the object is illuminated by light projected from the viewing system, by the phenomenon of back scatter. A diffusive medium is a medium such as fog or sea water which contains refractive diffused particulate matter.

Forward scatter is the scattering of light transmitted from the viewed object to a viewing system as the result of random refractions by the particles, some of the scattered light being sensed by the viewing system. While some of the light transmitted from the object will reach the viewing system without interacting with any particles, and will therefore provide a clear image of the object, the sensed scattered light will degrade the image at the photodetector of the system. If the viewing system is more than a limited distance from the object, the scattered light will cause the image to be totally unviewable.

Forward scatter generally becomes a significant problem at distances which exceed 10 attenuation lengths, and makes an object completely unviewable at 15 attenuation lengths. For example, if sea water contains a large concentration of certain refractive microorganisms, a conventional viewing device such as a television camera would be unable to distinguish an object located more than 15 attenuation lengths away. An attenuation length is the distance at which the unscattered power of transmitted light drops to $e^{-1}$ of its initial value.

Back scatter is the scattering of light projected from a source of light by refractive particles of a diffusive medium, where some of the scattered light is directed back toward the source. It is clear that back scatter will further degrade an image of an object which is viewed by a system which must provide illumination for the object.

Conventional techniques for overcoming the detrimental effects of back scatter in a diffusive medium such as sea water include volume scanning and range gating. According to the range gating technique, successive pulses having time durations on the order of nanoseconds are employed to illuminate an object to be viewed, and a shutter which selectively allows light to be admitted to the system is operated in synchronization with the projection of the pulses so that the shutter is only open during periods on the order of nanoseconds. The shutter remains closed as a pulse travels to an object to be viewed so that backscatter generated thereby is not viewed by the system. However, as a pulse reflected from the object returns through the diffusive medium, it generates a substantial amount of forward scattered light. When the shutter is opened for a nanosecond period to receive the reflected pulse, the forward scttered light will also be received by the system.

The technique of range gating is exemplified in U.S. Pat. No. 3,467,773, 1969, to P. J. Heckman Jr., which discloses the use of an electronic shutter which may be opened for periods having an order of magnitude of 20 nanoseconds. However, in order to shutter out forward scattered as well as back scattered light generated by successive illuminating pulses, a shutter must be used which has a shutter speed in the range of picoseconds rather than nanoseconds. Present electronic technology is incapable of providing an electronic shutter which can operate with such speed.

A dynamic diffusive medium is a diffusive medium in which the particles are in continuous random motion. As far as is known, the only means for overcoming forward scatter in a non-dynamic diffusive medium is an invention by Applicant, disclosed in a previously filed patent application entitled "Coherence Length Gated Optical Imaging System" Ser. No. 937,655, filed Aug. 28, 1978. In addition, a system for overcoming forward scatter in a dynamic diffusive medium is disclosed in another application previously filed by Applicant entitled "Optical Heterodyne System For Imaging In a Dynamic Diffusive Medium" Ser. No. 930,283, filed Aug. 2, 1978. Such system discriminates between scattered light and unscattered light by recognizing that scattered light is shifted in frequency in a dynamic diffusive medium due to the Doppler effect. The system employs a narrow pass filter adjusted to the frequency of unscattered light to filter out frequency-shifted scattered light.

SUMMARY OF THE INVENTION

In the present invention, the Applicant discloses gated pulse imaging apparatus for providing an image of an object when a diffusive medium is located between the apparatus and the object, the apparatus employing an optical shutter means having a shutter speed in the range of picoseconds. By employing shutter means having a shutter speed, or open period, which is on the order of $10^3$ or $10^4$ times faster than the electronic shutter of the prior art, Applicant is able to provide imaging apparatus which is capable of overcoming the degrading effects of forward scatter as well as back scatter in viewing through a diffusive medium.

Applicant's invention is usefully embodied in apparatus comprising a means for projecting successive pulses of coherent light through a diffusive medium to an object, each of the coherent light pulses having a time duration in the range $10^{-12}$–$10^{-10}$ seconds, the apparatus further comprising means for selectively receiving light transmitted through the medium, including light of the coherent light pulses which is reflected from various light reflective surfaces of the object. The aforementioned optical shutter means employed by the apparatus is selectively positioned in relation to the receiving means for allowing light transmitted through the medium to be received by the receiving means during shutter activation time periods, or periods when the shutter is open, shutter activation time periods likewise being in the range $10^{-12}$–$10^{-10}$ seconds. A synchronous means coupled between the pulse projecting means and the optical shutter means commences a shutter activation time period at the conclusion of a pulse travel time period, the pulse travel time period commencing when a given one of the coherent light pulses is projected by the pulse projecting means, the duration of the pulse travel time period being equal to the minimum time required for a wavefront of the given coherent light pulse to travel through the medium from the pulse projecting means to a selected light reflective surface of the object, and then from the selected light reflective surface to the receiving means. Means cooperating with the receiving means provides sets of light responsive signals, each of the sets representing an image of light reflective surfaces of the object which are included in one of one or more discrete viewing spaces, and storage means are provided for storing sets of light responsive signals. A display means for combining all of the images represented by the sets of light responsive signals provides an image of the object.

In this application, a viewing space of a viewing system such as an apparatus embodying the invention claimed herein is defined as the portion of object space, located at a selected range from the viewing system, in which all light generating events which may be perceived by the viewing system are located. The linear dimension of the viewing space taken along the range axis is the depth of field of the viewing system. Light generating events, including light projection, light reflection, light refraction, and light diffraction which are not located in the viewing space are not perceived by the viewing system, even if the range from the viewing system thereto is less than the range from the viewing system to the viewing space.

Preferably, the optical shutter means of the above apparatus comprises a saturable dye cell which is positioned in relation to the receiving means so that light must pass through a selected volume of the saturable dye cell in order to be received by the receiving means, the selected volume becoming transparent during each shutter activation time period. The synchronous means preferably comprises an optical path coupled between the pulse projecting means and the saturable dye cell so that light of a given coherent light pulse is coupled to the saturable dye cell at the conclusion of a pulse travel time period to activate the cell, i.e., to make the selected volume thereof transparent, for a time equal to the duration of the given coherent light pulse. The optical path includes a variable optical delay means for varying the length of the optical path to select the viewing space to be viewed by the apparatus.

In a modification of the above apparatus, the light received by the receiving means during successive shutter activation periods is optically heterodyned with a local oscillator coherent light signal. In such modification, the receiving means comprises an array of light sensitive surfaces, and the means for providing light responsive signals includes an array of light responsive elements, each of the light responsive elements being joined to one of the light sensitive surfaces, and each of the light responsive elements providing an electronic signal which represents the light impinging upon its joined light sensitive surface. The means for projecting coherent light pulses comprises a continuous wave laser of selected frequency which drives or "pumps" a mode locked dye laser to produce coherent light pulses in the picosecond range. A frequency shifting means is provided which receives light from the continuous wave laser to provide a local oscillator coherent light signal which has a frequency which is different from the frequency of the continuous wave laser, the frequency difference being equal to an intermediate frequency. The intermediate frequency is selected to be in the range at which electronic filter and video equipment is operated. The modification also provides a means for focusing the local oscillator coherent light signal on each of the light sensitive surfaces of the receiving means in a selected sequence to generate each of the aforementioned electronic signals. The electronic signals are coupled through an electron multiplier to provide current pulses, each pulse having a time duration equal to the activation period of the shutter. The current pulses are passed through a narrow bandpass filter to provide a signal which represents an image of the object.

Such modification, which operates according to the aforementioned principle that light which is scattered in a dynamic diffusive medium experiences a Doppler frequency shift, may usefully be employed to improve scatter discrimination in viewing through a dynamic diffusive medium.

OBJECTS OF THE INVENTION

An object of the invention is to provide a new and improved system for eliminating or substantially reducing the degrading effects of forward scatter and back scatter on a system for viewing an object through a diffusive medium.

Another object is to provide an improved viewing system in which pulses having a duration on the order of picoseconds are projected through a diffusive medium to illuminate an object, an optical shutter being opened for a period on the order of a picosecond, at some time after a pulse has been projected, to receive a light component of the pulse which has been reflected from the object back through the medium.

Another object is to provide a viewing system of the above type which employs a saturable dye cell as an optical shutter, the cell becoming transparent when light of a projected pulse is coupled thereto through an optical path of variable length.

Another object is to provide a system in which ultra high speed gated pulse and optical heterodyne imaging techniques are combined to overcome the degrading effects of forward scatter and back scatter in viewing through a dynamic diffusive medium.

These and other objects of the invention will become more readily apparent from the ensuing specification when taken together with the drawings.

BRIEF DESCRIPTION OF THE DRAWINGS

FIG. 1 shows a block diagram of an embodiment of the invention, and of an object to be viewed or imaged by the embodiment through a diffusive medium.

FIG. 4 shows a plot of current pulses versus time which is also useful for understanding the modification of FIG. 2.

FIG. 5 shows a perspective view of an image dissector for use in the modification of FIG. 2, a section thereof being broken away.

DESCRIPTION OF THE PREFERRED EMBODIMENT

Figures 2, 3:
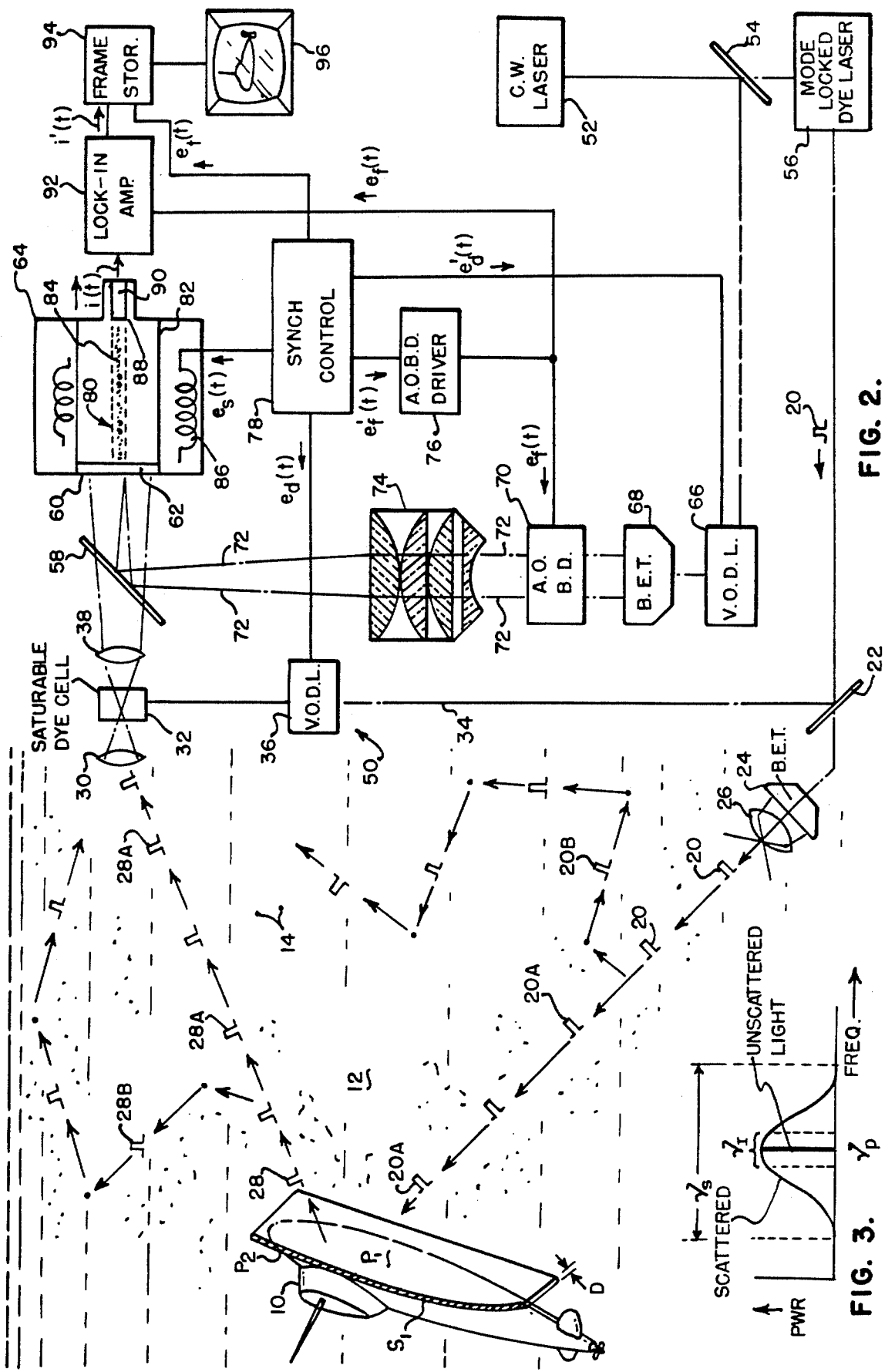
FIG. 2 shows a block diagram of a modification of the embodiment of FIG. 1.
FIG. 3 shows a plot of optical power versus frequency which is useful for understanding the modification of FIG. 2.

Referring to FIG. 1, there is shown an object such as a submarine 10 located in a dynamic diffusive medium 12, such as a body of seawater which contains a diffusion of refractive particles 14. For example, particles 14 may comprise micro-organisms in a heavy concentration of a type of micro-organism which is known to refractively scatter light passing therethrough. Apparatus 16 is also located in medium 12 to view submarine 10, and is provided with pulsed laser 18. Pulsed laser 18 generates successive pulses at a selected pulse repetition rate, each pulse having a time duration of 1 picosecond. When a pulse 20 is generated by pulsed laser 18, it is projected through beam splitter 22, beam expanding telescope 24, and lens 26 into medium 12, the projected pulses being directed toward submarine 10. Pulsed laser 18 usefully comprises a gaseous or dye-type laser which is mode locked according to techniques well known in the art to achieve pico-second operation. Gaseous lasers having sufficient pulse repetition rates and sufficient power for use in an undersea environment have been demonstrated and are described, for example, in an article entitled "Blue-Green Lasers for Ocean Optics" by M. B. White, published in *Optical Engineering*, Vol. 16, No. 2, March–April 1977, pp. 145-151. Telescope 24 usefully comprises a BET manufactured by JODON.

A component 20A of each projected pulse travels through medium 12 without being scattered by or interacting with any of the particles thereof, and illuminates submarine 10 for a very short picosecond period, or flash. A component 20B of each projected pulse 20 is scattered by particles 14 and is directed back toward apparatus 16, pulses 20B therefore representing backscattered light. Light of successive pulses 20A impinging upon various light reflective surfaces of submarine 10, comprising successive pulses 28, is reflected back toward apparatus 16 through medium 12, a component 28A of each reflected pulse traveling through medium 12 without being scattered by or interacting with any of the particles thereof. Consequently, a clear and undistorted image of the various light reflective surfaces of submarine 10 is carried on the wavefronts of successive pulses 28A. A component 28B of each reflected pulse represents forward scattered light, or light which is scattered by particles 14 of medium 12, and which is also directed back to apparatus 16. It will be noted that the component of a pulse 28 which is forward scattered in medium 12 travels a longer path than a component thereof which is directly reflected from submarine 10 to apparatus 16, so that the directly reflected components 28A reach apparatus 16 before the forward scattered components 28B.

Referring further to FIG. 1, there is shown a lens 30 which focuses light reaching apparatus 16 upon saturable dye cell 32. Cell 32 is a device which is well known in the art, and is opaque to the passage of light except during periods when coherent light of a minimum intensity level is projected thereupon. During such periods, the cell is activated and made transparent to light impinging thereupon. If light of minimum activating intensity suddenly stops impinging upon the saturable dye cell 32, the cell immediately returns to its opaque state.

By employing beam splitter 22 as shown in FIG. 1, a component of light of each pulse generated by pulsed laser 18 is coupled or directed into an optical path 34, which includes a variable optical delay line 36, the other end of optical path 34 being coupled to saturable dye cell 32. Each light component traveling through optical path 34 is of sufficient intensity to activate cell 32 upon arriving thereat for a time period equal to the duration of pulses 20, or for one picosecond.

When a pulse 20 is projected into medium 12, a pulse travel time period commences, and when the light component of the pulse which travels through path 34 reaches cell 32, the pulse travel time period concludes. Thereupon, cell 32 is activated, or made transparent, for a one picosecond period. Cell 32 is positioned in relation to a lens 38 and a silicon intensive target camera 40 of apparatus 16 so that light impinging upon cell 32 from medium 12 passes therethrough to the detector plane of camera 40 only when cell 32 is transparent. Since light from medium 12 has insufficient intensity to activate cell 32, cell 32 becomes transparent only during picosecond time periods which are separated by intervals determined by the pulse repetition rate of pulsed laser 18.

It is readily apparent that saturable dye cell 32 is employed in apparatus 16 as an ultra high speed shutter. It is also apparent that cell 32 is opened at a selected time following the projection of a given pulse 20 which is determined by adjustment of variable delay line 36.

Referring once more to FIG. 1, there are shown planes $P_1$ and $P_2$ passing through submarine 10, planes $P_1$ and $P_2$ being orthogonal to the direction of projected pulses 20 and reflected pulses 28. Planes $P_1$ and $P_2$ are separated by a distance D, which is equal to $c\Delta t/n$, where c is the speed of light, $\Delta t$ is the time duration of pulses projected by pulsed laser 18 or 1 picosecond, and n is the index of refraction of medium 12. In other words, D is the distance that an unscattered pulse 20A or 28A travels during a time period $\Delta t$.

As aforementioned, pulses 28A comprise unscattered light of pulses 20 which has been reflected from various reflective surfaces of submarine 10, and therefore carry an undistorted image of such reflective surfaces. Surface $S_1$ is the portion of such reflective surfaces which lies between planes $P_1$ and $P_2$. When variable optical delay line 36 is adjusted so that the length of optical path 34 is equal to $2R_1$, twice the range of plane $P_1$ from apparatus 16, such portion of a given pulse 28A as has been reflected from surface $S_1$ will arrive at saturable dye cell 32 at precisely the same time that cell 32 is being opened or activated by light of the same pulse 20 which generates the given pulse 28A. Consequently, light carrying an image of surface $S_1$ passes through cell 32 and impinges upon the detector plane of camera 40. However, other portions of the given pulse 28A, comprising light reflected from surfaces of submarine 10 which do not lie between planes $P_1$ and $P_2$, arrive at cell 32 either before or after the same is opened or activated.

The volume between planes $P_1$ and $P_2$ comprises the viewing space of apparatus 16 when optical delay line 36 is adjusted to provide a path length of $2R_1$, and the spacing therebetween is the depth of field of apparatus 16, according to the aforementioned definitions of viewing space and depth of field, respectively. It will be readily apparent that, since apparatus 16 views only the light generating events occurring in a very narrow portion of object space for a given adjustment of delay line 36, nearly all of the forward scatter and back scatter events occurring between submarine 10 and apparatus 16 will be outside of the viewing space, and will therefore not be perceived by apparatus 16. Most of the back scatter events will impinge upon cell 32 before the same becomes transparent, and most of the forward scatter events will impinge upon cell 32 after the same has returned to its opaque state. Apparatus 16 will view only the scattering events which occur in the viewing space between planes $P_1$ and $P_2$, and also scattering events occurring between apparatus 16 and submarine 10 which coincidentally impinge upon cell 32 when the cell is activated for picosecond period. However, such viewed scattering events will be too insignificant to prevent a viewable image of surface $S_1$ from being provided by apparatus 16.

Silicon intensive camera 40, which usefully comprises a QX-10 manufactured by Quitnex, stores an image of light impinging thereupon, even light impinging for only a picosecond. Frame integrator 42, which usefully comprises a DS 12 manufactured by Quitnex, is an electronic device which integrates a series of images supplied by camera controller 44.

A synchronous control 46, which may include a suitably programmed minicomputer, couples a signal $e_d(t)$ to variable optical delay line 36 after a pulse 20 has been projected into medium 12 to increase the length of optical path 34 by an amount equal to D. Consequently, each pulse in a succession of projected pulses 20 causes camera 40 to receive images or frames from a different discrete viewing space each viewing space including a different portion of the reflective surfaces of submarine 10. A set of electronic signals representing each image or frame is stored in frame storage 44. When sets of signals representing all of the reflective surfaces of submarine 10 from which light is reflected to apparatus 16 are stored in frame storage 44, all of such sets are coupled to display screen 46 to provide a complete image of submarine 10.

While apparatus 16 employs a pulsed laser for providing picosecond pulses and a saturable dye cell operating at the same rate, it is anticipated that scatter discrimination could be improved still further by using illuminating pulses which were even shorter than a picosecond. If a saturable dye cell were employed in such system, the minimum pulse period would be limited by the relaxation time of the dye cell, or time required for the cell to return from its transparent state to its opaque state after the activating light signal was removed therefrom.

Referring to FIG. 2, there is shown apparatus 50, comprising a modification of apparatus 16, which is likewise located in dynamic diffusive medium 12 to view or to provide an image of submarine 10. Apparatus 50 is provided with a continuous wave laser 52 which provides a continuous beam of laser light of a particular frequency $v_p$. The coherent light beam from laser 52 passes through beam splitter 54 to drive, or "pump", mode locked dye laser 56 in a manner well known in the art, whereupon mode locked dye laser generates a succession of coherent light pulses having a 1 picosecond time duration at a pulse repetition rage $P_r$. Laser 52 may comprise, for example, an Argon gaseous laser such as the Argon laser referred to in Table 1, p. 150 of the White article, hereinbefore cited. As in apparatus 16, the pulses 20 pass through beam splitter 22 to beam expanding telescope 24 and lens 26 and so into medium 12 in the direction of submarine 10. Beam splitter 22 also couples a component of light from each pulse 20 through optical path 34 and variable optical delay line 36 to saturable dye cell 32 so that selected portions of unscattered light pulses 28A may pass through cell 32, in the manner previously described in conjunction with apparatus 16 of FIG. 1.

When the portion of a pulse 28A carrying an image of reflective surface $S_1$ is admitted through cell 32, it is focused by lens 38, through beam splitter 58, upon the detector plane 60 of photocathode 62 of image dissector 64. Image detector 64 comprises a device well known in the field, such as a Vidisector camera manufactured by the Aerospace/Optical Division of ITT. Detector plane 60 is usefully conceptualized as comprising an array of discrete light sensitive surfaces, and photocathode 62 is usefully conceptualized as comprising an array of discrete light responsive elements, each element being joined to one of the light sensitive surfaces. Even though the light of each unscattered pulse 28A impinges upon detector plane 60 for only a few picoseconds, it is still of a particular frequency $v_p$, the frequency of light provided by the dye laser 56.

In addition to the unscattered light of a pulse 28A, providing an undistorted image of surface $S_1$, some scattered light also impinges upon detector plane 60 during a picosecond cell activation period. As aforementioned, such scattered light includes light of scattering events which occur in the volume between planes $P_1$ and $P_2$, and also includes back scattered light and forward scattered lght which by coincidence happens to arrive at cell 32 at a time when the same is activated. However, such received scattered light is not of a single frequency. As is well known, when light is scattered from a particle in motion, the frequency of the light is shifted by an amount $\Delta v$, which is determined by the direction and speed of the particle, in accordance with the Doppler principle. Since each of the scattering particles in a dynamic diffusive medium will, in general, have a different velocity, there will be a distribution of particle velocities within the medium. Consequently, the frequency components of scattered light in the medium will also be distributed over a continuous frequency spectrum of width $v_s$, which is centered at $v_p$, the frequency of unscattered light.

Referring to FIG. 3, there is shown a plot of optical power versus frequency of the light impinging upon detector plane 60 of photocathode 62 during a picosecond cell activation period. As aforementioned, unscattered light, providing an undistorted image of reflective surface $S_1$, is at a single frequency $v_p$. On the other hand, scattered light impinging upon detector plane 60 during a picosecond time period is distributed over a spectrum $v_2$ centered at $v_p$.

It will be readily apparent from FIG. 3 that the degrading effects of back scattered and forward scattered light received by detector plane 60 through cell 32 could be effectively eliminated by passing all of the light of the spectrum shown in FIG. 3 through an optical narrow-band filter. All light having frequency components not included within a very narrow bandwidth $v_f$, centered around the unscattered light frequency $v_p$, would thereby be removed, the removed light including most of the interferring scattered light. However, the present state of the art does not provide any such narrow-band optical filter. Therefore, modified apparatus 50 includes components for generating a local oscillator coherent light signal which is mixed or heterodyned with light received through cell 32 during each cell activation period to shift the frequency spectrum shown in FIG. 3 from a range of optical frequencies to a range of electronic frequencies. An electronic filter having a narrow passband is then employed to remove the interferring effects of scattered light.

Referring again to FIG. 2, there is shown beam splitter 54 reflecting light of continuous wave laser 52 into an optical path which includes variable optical delay line 66, beam expanding telescope 68, and acousto-optic beam deflector 70. The light of the laser 52 is shifted in frequency by an amount equal to an intermediate frequency, such as 100 KHz, by beam deflector 70 to provide local oscillator signal 72. A flat-field scan lens 74 focuses local oscillator signal 72 within an Airy disc of a few microns diameter upon the surface of detector plane 60 of photocathode 62. Beam deflector 70 receives signals $e_f(t)$ from acousto-optic beam deflector driver 76, which cause local oscillator signal 72 to be sequentially focused, for a selected dwell time period, within each of the aforementioned light sensitive surfaces comprising detector plane 60. The dwell time period is selected in relation to pulse repetition rate $R_p$ of the pulses projected by mode locked dye laser 56 so that an image of a surface $S_1$ is repeatedly flashed upon detector plane 60 by a selected number of pulse 28A during each dwell time period.

Beam expanding telescope 68 usefully comprises a BET 25 manufactured by Jodon, and acousto-optic beam deflector 70 usefully comprises a device such as the Acousto-optic Laser Beam Deflector Scanner, model LD401, manufactured by Isomet. Driver 76 comprises a conventional electronic circuit used in conjunction with beam deflector 70, and provides signals $e_f(t)$ in response to signals $e'_f(t)$ coupled thereto from a synchronous control 78, which usefully includes a suitably programmed minicomputer.

In the operation of an image dissector, light impinging upon a given light sensitive surface of detector plane 60 causes the light responsive element joined thereto to project an electron stream 80 into the drift tube 82 of the image dissector. In accordance with the principles of optical heterodyning or mixing, the electron stream 80 projected by the light responsive element upon which local oscillator signal 72 is focused includes an electron stream 84 of two microns diameter. Electron stream 84 comprises a signal detectable by standard electronic equipment, and includes frequency components in a frequency spectrum of width $\nu_s$, centered at the aforementioned intermediate frequency.

The intermediate frequency component included in an electron stream 84 represents unscattered light impinging upon the light responsive element which projects the electron stream 84. Consequently, the intermediate frequency component represents the portion of an image of a surface $S_1$ which impinges upon the light responsive element during successive picosecond time periods. Other frequency components in the electron stream 84 represent scattered light impinging upon the light responsive element.

Image dissector 64 is provided with coils 86 positioned around the drift tube 82 thereof to selectively direct an electron stream 80 through an aperture 88 to a dynode chain or other electron multiplying device 90. Aperture 88 is usefully circular and has a 200 micron diameter. Synchronous control 78 couples signals $e_s(t)$ to coils 86, signals $e_s(t)$ being synchronized with signals $e'_4(t)$ so that coils 86 always direct the electron stream 80 through aperture 88 which is being generated by the light responsive element upon which local oscillator signal 72 is focused. Consequently, each electron stream 80 received by electron multiplier 90 includes an electron stream 84. In response to an electron stream 84, multiplier 90 generates a current i(t) comprising a train of current pulses of picosecond time duration, the repetition rate of the current pulses being the same as the repetition rate of the light pulses projected by mode locked dye laser 56.

While each current pulse lasts for only a picosecond, it includes frequency components in the aforementioned spectrum $\nu_s$, centered at the intermediate frequency. Current pulses i(t) are coupled to lock-in amplifier 92, a conventional narrow-band filter which is set to exclude all frequency components in the i(t) current pulse train which are not included in a frequency range $\nu_I$, centered at the aforementioned intermediate frequency. $\nu_I$ is much narrower than the bandwidth $\nu_s$, for example, 1/100 thereof. The driving signal $e_f(t)$ is coupled from driver 76 to lock-in amplifier 92 so that the passband of amplifier 92 is always centered at the intermediate frequency, regardless of the specific value of the intermediate frequency. The output of amplifier 92 therefore comprises the envelope of the current pulse train which is at the intermediate frequency from which nearly all of the envelope frequency components representing scattered light have been removed by the narrow bandpass filtering operation of amplifier 92.

Referring to FIG. 4, there is shown current i'(t) outputed by amplifier 92 while local oscillator signal 72 is focused upon the light sensitive surface of a given light responsive element. According to the Sampling Theorem, a signal which contains no frequency components greater than a frequency $f_m$ is uniquely determined by its values at uniform intervals, if such intervals are no greater than $\frac{1}{2} f_m$ seconds. Since the greatest frequency component in the current i'(t) is effectively the intermediate frequency plus $\nu_{s/2}$, mode locked dye laser 56 is adjusted so that it generates a pulse 20 at intervals equal to twice the reciprocal of the intermediate frequency, plus $\nu_{s/2}$. For example, if the intermediate frequency is 100 KHz and $\nu_s = 0.2$ MHz, a pulse 20 is generated every $\frac{1}{4} = 10^{-5}$ seconds, or every 2.5 microseconds. It follows that current i'(t) provided by amplifier 92 during a given dwell time period comprises a signal of electronic frequency which represents the portion of an image of a surface $S_1$ which impinges upon the light responsive light receiving local oscillator signal 72 during the given dwell time period. A set of such signals are derived by sequentially focusing local oscillator 72 on each of the light responsive elements comprising photocathode 62, such set of signals representing an entire surface $S_1$.

Successive sets of signals are generated by changing the optical length of optical path 34 a distance D after each focusing sequence. A signal $e_d'(t)$ is also coupled thereupon from control 78 to correspondingly vary the length of delay line 66 so that local oscillator wavefronts and incoming pulse wavefronts are always matched at detector plane 60. The signals of each successive set are stored in frame storage 94, which is controlled by signals $e_t(t)$ from control 78. When sets of signals representing all of the surfaces of submarine 10 from which light is reflected to apparatus 50 have been stored in frame storage 94, all of the signals in the sets are employed by conventional video display means 96 to provide a complete viewable image of submarine 10.

In order for a signal comprising a current i'(t) to reliably represent a portion of an image of a surface $S_1$ impinging upon a light responsive element, dwell time should be no less than the reciprocal of the bandwidth of the lock-in amplifier, or no less than $1/\nu_I$.

Referring to FIG. 5, there is shown an image $S_1'$ of surface $S_1$ upon detector plane 60 of photocathode 62, image $S_1'$ being flashed upon detector plane 60 by successive unscattered pulses 28A, as aforementioned. Scattered light 98 also impinges upon detector plane 60 and degrades image $S_1'$. A light responsive element 100 having a light sensitive surface 102 is broken out of photocathode 62 for illustration purposes, element 100 being one of the elements in the array of elements comprising photocathode 62, and light sensitive surface 102 being one of the surfaces in the array of surfaces comprising detector plane 60. Local osscillator 72 is focused upon light sensitive surface 102 in an Airy disc 104, as aforementioned. Unscattered light 106 and scattered light 108 impinge upon light sensitive surface 102, light 106 representing a portion of the unscattered light which provides image $S_1'$, and light 108 representing a portion of scattered light 98.

Obviously, many modifications and variations of the present invention are possible in the light of the above teachings, and, it is therefore understood that within the scope of the disclosed inventive concept, the invention may be practiced otherwise than as specifically described.

What is claimed is:

1. Apparatus for providing an image of an object when a diffusive medium is located between said apparatus and said object, said apparatus comprising:
   means for projecting successive pulses of coherent light through said medium to said object, each of said coherent light pulses having a time duration in the range $10^{-12}$–$10^{-10}$ seconds;
   means for selectively receiving light transmitted through said medium, including light of said coherent light pulses which is reflected from various light reflective surfaces of said object;
   optical shutter means selectively positioned in relation to said receiving means for allowing light transmitted through said medium to be received by said receiving means during shutter activation time periods, said shutter activation time periods being in the range $10^{-12}$–$10^{-10}$ seconds, a shutter activation time period occurring while a coherent light signal is being coupled to said optical shutter means;
   synchronous means coupled between said pulse projecting means and said optical shutter means for commencing a shutter activation time period at the conclusion of a pulse travel time period, said pulse travel time period commencing when a given one of said coherent light pulses is projected by said pulse projecting means, the duration of said pulse travel time period being equal to the minimum time required for a wavefront of said given coherent light pulse to travel through said medium from said pulse projecting means to a selected one of said light reflective surfaces of said object, and then from said selected light reflective surface to said receiving means;
   means cooperating with said receiving means for providing sets of light responsive signals, each of said sets representing an image of light reflective surfaces of said object which are included in one of one or more discrete viewing spaces;
   storage means for storing said sets of light responsive signals; and
   display means for combining all of the images represented by said sets of light responsive signals to provide an image of said object.

2. The apparatus of claim 1 wherein:
   said optical shutter means comprises a saturable dye cell which is positioned in relation to said receiving means so that light must pass through said saturable dye cell in order to be received by said receiving means.

3. The apparatus of claim 2 wherein:
   said synchronous means comprises an optical path coupled between said pulse projecting means and said saturable dye cell so that light of said given coherent light pulse is coupled to said saturable dye cell to activate said saturable dye cell at the conclusion of said pulse travel time period for a time equal to the duration of said given coherent light pulse, said optical path including a variable optical delay means for selectively varying the length of said optical path.

4. The apparatus of claim 3 wherein:
   control means are coupled to said variable optical delay means for changing the length of said optical path at the conclusion of each of a succession of pulse travel time periods by an amount equal to the product of the speed of light and the duration of pulses projected by said pulse projecting means divided by the index of refraction of said diffusive medium.

5. The apparatus of claim 1 wherein:
   said means for providing sets of light responsive signals comprises a means for generating sets of electronic signals, the electronic signals in each of said sets representing an image of light reflective surfaces of said object which are included in one of one or more discrete viewing spaces.

6. The apparatus of claim 5 wherein said means for providing sets of electronic signals comprises:
   a silicon intensive camera, said receiving means comprising the image plane of said silicon intensified camera; and
   an optical multichannel analyzer coupled between said camera and said storage means for providing said sets of electronic signals.

7. The apparatus of claim 6 wherein:
   said display means comprises a video display means receiving said sets of electronic signals from said storage means.

8. Apparatus for providing an image of an object when a dynamic diffusive medium is located between said apparatus and said object, said apparatus comprising:
   means for selectively receiving light transmitted through said medium, including light reflected from various light reflective surfaces of said object;
   a saturable dye cell selectively positioned in relation to said receiving means for allowing light transmitted through said medium to be received by said receiving means during each of a succession of cell activation periods, said saturable dye cell being transparent to light impinging upon it during each of said cell activation periods, the minimum time duration of said cell activation time periods being limited by the relaxation time of said saturable dye cell;

means for projecting successive pulses of coherent light through said medium to said object at selected intervals, each of said coherent light pulses having a time duration equal to the time duration of said cell activation periods;

means coupled between said pulse projecting means and said saturable dye cell for providing an optical path of variable path length to transmit a component of light of each of said projected coherent light pulses from said pulse projecting means to said saturable dye cell;

means cooperating with said receiving means for providing sets of light responsive signals, the light responsive signals of said sets together representing an image of said object; and display means receiving said sets of light responsive signals for providing an image of said object.

9. The apparatus of claim 8 wherein:

said receiving means comprises an array of light sensitive surfaces;

said means for providing said sets of light responsive signals includes an array of light responsive elements, each of said light responsive elements being joined to one of said light sensitive surfaces, each of said light responsive elements providing an electronic signal which represents the light impinging upon its joined light sensitive surface; and said projecting means includes a continuous wave laser of selected frequency and a mode locked dye laser, said mode locked dye laser receiving light from said continuous wave laser to generate said coherent light pulses at selected intervals.

10. The apparatus of claim 9 wherein said means for providing said sets of light responsive signals includes optical heterodyne means comprising:

means receiving light from said continuous wave laser for providing a local oscillator coherent light signal which has a frequency which is different from the frequency of said dye laser, said frequency difference being equal to an intermediate frequency; and means for focusing said local oscillator coherent light signal in an Airy disc on each of said light sensitive surfaces of said receiving means in a selected sequence, said local oscillator coherent light signal being focused on each light sensitive surface for a selected dwell time period.

11. The apparatus of claim 10 wherein said means for providing said sets of light responsive signals includes:

an image dissector, said array of light responsive elements comprising a photocathode for said image dissector, said array of light sensitive surfaces comprising the detector plane of said photocathode;

an electron multiplying means positioned in relation to said image dissector to receive a heterodyned electronic signal generated by a given one of said light responsive elements when said local oscillator coherent light signal is focused on the light sensitive surface of said given light responsive element, said electron multiplying means for generating a current pulse in response to each received heterodyned electronic signal, each of said current pulses comprising frequency components in a frequency range, $v_s$, which is centered at said intermediate frequency, said frequency range $v_s$ having a width equal to the width of a spectrum which includes the frequency components of light scattered by said dynamic diffusive medium; and a narrow band filter means receiving successive current pulses generated by said electron multiplying means for providing a filtered current pulse envelope provided by said narrow band filter means during a given dwell time period comprising a light responsive signal included in one of said sets of light responsive signals, said narrowband filter means having a bandwidth centered at said intermediate frequency which is narrower than said spectrum.

12. The apparatus of claim 11 wherein:

said mode locked dye laser comprises a means for generating coherent light pulses at intervals which are no greater than one half of the reciprocal of the sum of said intermediate frequency and one half of $v_s$.

13. The apparatus of claim 12 wherein:

said apparatus includes control means coupled to said variable optical delay means for changing the length of said optical path by an amount equal to the product of the speed of light and the duration of pulses projected by said mode locked dye laser divided by the index of refraction of said diffusive medium at the conclusion of each of said selected focusing sequences of said local oscillator coherent light signal, the filtered current pulses generated by said narrow band filter means during one of said selected focusing sequences comprising one of said sets of light responsive signals.

14. The apparatus of claim 13 wherein:

said narrow band filter means comprises a filter having a bandwidth which is no greater than the reciprocal of said dwell time period.

* * * * *